United States Patent [19]
Kropp

[11] Patent Number: 5,138,172
[45] Date of Patent: Aug. 11, 1992

[54] APPARATUS AND METHOD FOR APPLYING INFORMATION ENERGY TO A SUBSTRATE

[76] Inventor: K. E. Werner Kropp, CH-6645 Brione S/M, Via Storta 78, Fed. Rep. of Germany

[21] Appl. No.: 616,041

[22] Filed: Nov. 20, 1990

Related U.S. Application Data

[63] Continuation-in-part of Ser. No. 388,778, Aug. 1, 1989, Pat. No. 5,012,110, which is a continuation-in-part of Ser. No. 37,752, Apr. 13, 1987, abandoned.

[30] Foreign Application Priority Data

Nov. 20, 1989 [DE] Fed. Rep. of Germany ....... 3938511
Oct. 5, 1990 [DE] Fed. Rep. of Germany ....... 4031632

[51] Int. Cl.$^5$ .............................................. H01J 37/00
[52] U.S. Cl. ................................................ 250/492.1
[58] Field of Search ................................... 250/492.1

[56] References Cited

U.S. PATENT DOCUMENTS

| | | | |
|---|---|---|---|
| 4,432,098 | 2/1984 | Gelinas | 455/41 |
| 4,491,795 | 1/1985 | Gelinas | 324/248 |

OTHER PUBLICATIONS

"Is Homoeopathy a Placebo Response"?, Lancet, Oct. 18, 1986, David T. Reilly et al., pp. 881–886.
"Control of Stillbirths in Pigs Using Homepathy", Journal of the American Institute of Homeopathy, C. E. I. Day, Dec. 1986 79 (4), pp. 146–147.
"Human basophil degranulation triggered by very dilute antiserum against IgE.", E. Davenas et al., Nature vol. 333 Jun. 30, 1988.
"Berechnung elektrischer Felder in biologischen Geweben auf der Basis von klassifizierten NMR-Bilddaten", U. Stilla et al., Biomedizinische Technik Band 32, Heft Nov. 11, 1987 (English Translation Also Attached).
"Vorzuge Der Magneti-Schenwasser-Behandlung" Dr. Klaus J. Kronenberg, Raum & Zeit, pp. 53–62 (English Translation Also Attached) (1989).
"Stereoelectronic Effects in Biomolecules", David G. Gorenstein, Chemical Rev. 1987, 87, pp. 1047–1077.
Advertisement–"The Natec Water-Conditioner" (Summary and Technical Description) 15 pages.
"Quantum Interference and the Aharanov-Bohm Effect," Y. Imry and R. A. Webb, Scientific American, Apr. 1989, pp. 56–62.

Primary Examiner—Bruce C. Anderson
Attorney, Agent, or Firm—Kirkpatrick & Lockhart

[57] ABSTRACT

A process and an apparatus for performing the process are provided wherein a synthetic homeopathic substrate is manufactured by placing a substrate between two magnets and feeding information energy, such as electromagnetic energy in a frequency range of an amount up to about twelve KHz, to the substrate along a path transverse to the connection axis.

14 Claims, 9 Drawing Sheets

APPARATUS AND METHOD FOR APPLYING INFORMATION ENERGY TO A SUBSTRATE

This application is a continuation-in-part of co-pending application Ser. No. 388,778 filed Aug. 1, 1989, now issued as U.S. Pat. No. 5,012,110, which is a continuation-in-part of application Ser. No. 037,752 filed Apr. 13, 1987, now abandoned.

BACKGROUND OF THE INVENTION

1. Field of the Invention

The present invention relates to the field of magnetochemistry, and more particularly, to a process and apparatus for synthesizing a magnetically altered substrate which will exhibit, upon use, a homeopathic effect. In particular, the process and apparatus of the present invention creates a magnetic vector potential field which magnetically alters the substrate.

2. Description of the Prior Art

Homeopathic medicine works on the principal that very small concentrations of appropriate products may have consequences that far outweigh those expected of them. In an article published in *The Lancet* in 1986, the authors reported that hay fever patients treated with a homeopathic preparation of mixed grass pollens showed a significant reduction in symptoms as compared to patients treated with a placebo. "Is Homeopathy A Placebo Response?, Controlled Trial of Homeopathic Potency, with Pollen In Hay Fever as Model," *The Lancet*, Oct. 18, 1986. A less rigorous study reported in "Control of Stillbirths In Pigs Using Homeopathy," *Journal of the American Institute of Homeopathy*, 79(4), 146–147 (Dec. 1986) showed a reduction in the number of stillbirths in pigs treated with the homeopathic remedy, caulophyllum.

Aqueous solutions of an antibody were reported to retain the ability to evoke biological responses, even when the solutions were diluted to such an extent that there was a negligible chance of there being a single molecule of antibody in any sample. E. Davenas, et al., "Human basophil degranulation triggered by very diluted antiserum against IgE," 33 Nature 816 (Jun. 30, 1988).

Magnetic fields have been used to treat water. Reports have been published, principally in Eastern Europe and The People's Republic of China, which describe observations of advantages obtained from the use of magnetically treated water. Some advantages claimed include reduced formation of boiler scale, dissolution of old lime deposits, accelerated plant growth, desalination of soils, improvement in the quality of cement, improvement in the taste and smell of drinking water, and favorable effects on patients with kidney stones. In addition, changes in the viscosity, IR absorption and surface tension of the water have been reported. See K. Kronenberg, "Advantages of Magnetic Water Treatment," Raume & Zeit, No. 33, p. 53 (1988).

Like the effects reported in homeopathy, the effects reported for magnetically treated water defy scientific explanation. Homeopathy is sometimes explained as copying information, e.g., a pattern or a combination of oscillations of different frequencies, onto a substrate from the information or pattern existing in the molecular structure of natural substances, e.g., herbs, antibodies, or pollen. The substrate with the copied information or pattern incorporated therein can then be used to effect a desired response. For example, in homeopathic medicine, the desired response might be the reduction of allergy symptoms in hay fever sufferers mentioned in the report cited above.

It is known that electrical fields are associated with biological tissue. See, for example, U. Still, et al., "Computation of Electric Fields in Biological Tissue on the Basis of Classified NMR Images," *Biomedizinische Technik*, Vol. 32, No. 11, 1987, pp. 288–292 and D. Gorenstein, "Stereoelectronic Effects in Biomolecules," *Chemical Review*, 1987, Vol. 87, No. 5, pp. 1047–1077.

One explanation of the effects of magnetically treated water is that the application of the treated water to biological tissue or some other substance, such as soil, cement or boilers as mentioned above, alters the electronic field of the substance sufficiently to alter the behavior of the properties of that substance and thereby obtain a desired result.

An object of the present invention is to provide an apparatus and a method for using such apparatus which will synthetically produce a homeopathic substrate. In other words, the object of the present invention is to provide an apparatus and method which introduce synthetic oscillations of differing frequencies (information energy) into a substrate which can then be used, depending on the nature of the substrate and the oscillations transmitted thereto, to elicit a desired result.

Another object of the present invention is the production of a substrate which is based on various substances and which, by virtue of modifications of its internal structural properties or transformation of certain active forces onto said substrate, has particular energy properties for various uses, for example, in the biological field.

SUMMARY OF THE INVENTION

The invention is, to some extent, related to homoeopathy. Whereas natural homoeopathy is explained as the use of a pattern of a combination of oscillations of different frequencies being copied from the pattern existing in the molecular structure of natural herbs, the invention introduces such oscillations into the substrate (mainly pharmaceutically acceptable carriers such as natural saline or massage oil) to produce a substrate with synthesized oscillation patterns. Although such synthesized oscillation patterns have an energy level in the order of that of homoeopathy, the energy level transmitted by the individual oscillation frequencies can be artificially varied, while a homoeopathic oscillation pattern (as a combination of several biologically frequent frequencies) are more or less fixed and can only be changed by mixing many kinds of homoeopathic substrates together.

The "synthesized homoeopathy" can be a mixture of different frequencies and specifically, the amplification of special frequencies in the mixtures. Such amplification of special frequencies is expected to be beyond the "traditional" natural frequency mixture or amplification of specific frequencies thereof and is surprisingly harmful to biological agitators and other agents.

A recent publication by others has disclosed research which indicates that the application of magnetic vector potential fields in a space otherwise free from magnetic fields is effective for creating positive biological effects. In particular, the article entitled "Aharnov-Bohm Effect" by Imry and Webb in the *Spectrum der Wissenschaft* (June 1989), the relevant portions of which are incorporated herein by reference, generally describes magnetic vector potential fields and their effects.

The invention at the present time shows the most effective promise in healing biological structures, which includes destroying biological agitators. The synthesized homoeopathy according to the invention can make use of other substrates besides oil and water.

The present invention appears to achieve its synthesized homeopathy due to the creation of the magnetic vector potential fields described in the Imry et al. reference. Surprisingly, the invention allows the use of magnetic vector potential fields for the specific energetic treatment of materials in a space otherwise free from magnetic fields. The reasons for this effect appear to be inherent in wave-mechanical or quantum-mechanical phenomena and possibly include interference phenomena.

The present invention also provides a method for producing a physical loading or a magnetically spin-based configuration pattern on a very small, but very effective, energy level. Broadly, the method of the present invention is defined as a method to make use of the deviations in the consistency of a substrate when exposed to, or treated in, a magnetic field for applying additional information energy of specifically defined frequencies on the substrate. More precisely, the method of the invention makes use of magnetic vector potential fields to apply informational energy to a substrate.

A preferred process according to the present invention for the production of a synthetic homeopathic substrate provides that the substrate is disposed between two magnets and information energy, in particular electromagnetic energy, is imparted to the substrate transversely, and preferably perpendicularly, with respect to the axis between the two magnets.

The information energy may be imparted to the substrate in various configurations of the magnetic field, including in regard to its orientation with respect to the magnetic field of the earth, with frequencies which differ according to the desired character of the transformed properties, in a substantially unlimited frequency range, and more particularly, by a coupling effect by way of electrically conductive or non-conductive materials, including semiconductors or semiconductor amplifiers.

In that connection, firstly an intermediate carrier, for example, a small iron plate, may be subjected to the action of the active charge or information energy, and is then subsequently used for further transfer to the substrate which is actually to be treated.

In its simplest form, an apparatus according to the present invention which is effective for the formation of a magnetic vector potential field in an area of space otherwise free from a magnetic field consists of a toroidally wound solenoid. The two opposite sides of the toroidal solenoid provide different and oppositely acting magnetic vector potential fields.

Preferably, several toroidal solenoids are aligned with one another to practice the process of the invention. In this configuration two or more solenoids are paired together and the flow of the direct electric current in the coils of each adjacent pair of solenoids is polarized. Specifically, when two toroidal solenoids are paired together with a desired distance between them, a sphere of influence is formed between the solenoids due to the magnetic vector potential fields associated with the solenoids. The nature of the sphere of influence depends on the directions of the electric current in the solenoids.

In an alternate embodiment the electro-static variant of the magnetic vector potential fields can be used to practice the method of the present invention.

Many different materials can be introduced into the sphere of influence of the toroidal solenoids and the materials are then oriented energetically by information energy from the sphere of influence. These spheres of influence can have contrasting effects, and are detectable as rotating to the right or to the left. The earth's magnetic field may also have an influence on the sphere of influence in a particular application. An informational orientation is effected by charging the material placed into the sphere of influence with a frequency transmission (e.g., electro-magnetic, acoustic or mechanical vibrational energy) in the form of a field (e.g. by antenna, modulated laser beam or the like).

Most importantly the materials provided by the practice of the invention which have a specific aimed information orientation are applicable in an advantageous manner in various fields, and particularly in the field of biology.

The use of the process and apparatus of the present invention in biological systems—said use being possible in a very specific and dosed manner—achieves therapies of biological systems which are free from side-effects and non-toxic. These therapies include prophylactic or antidegenerative treatments. For example, such therapies include treatments against destruction of the environment in which the natural (biological) balance is restored.

The process and apparatus of the present invention may also be used to make agricultural products resistant to insecticides and herbicides, and to facilitate the optimization of agricultural products. Additional uses include, for example, the activation and regeneration of biologically dead waters and the making of modified chemical products and metal alloys. Furthermore, damaging methods (e.g. incineration plants) can also be improved to be more effective and ecologically harmless through the process and apparatus of the present invention by changing the parameters (i.e., a lower temperature of incineration) of the method.

The specific use of the reciprocal effects of magnetic vector potential fields (or analogously electro-static vector potential fields) according to the invention can improve and simplify the production or recovery of basic substances (e.g. the production of hydrogen) thereby reducing the cost further it is believed that the process and apparatus of the present invention can make possible the recovery of free energy from space.

As carrier substances for receiving information patterns according to the present invention the following materials may be used: water, alcohol and similar liquids, gases, metals, and solid bulk or loose materials. The additional treatment of such substances is effected with light or laser beams or other beamed or diffuse electro-magnetic or corpuscular radiations.

In this connection, the application and use of magnetic or electro-static vector potential fields according to the present invention mostly reciprocates with all space fields given.

Finally, the process of the present invention can be used for conditioning of rooms in a biologically positive sense. For example, a specific laser beam treatment, on which the laser beam first passes through a sphere of influence of a magnetic vector potential field can be used to achieve the desired result.

When the substrate, which has been energy-treated in accordance with the invention, is used, the substrate then provides for transformation of the substances or materials which are to be influenced in respect of the properties and developments thereof.

For the purposes of carrying out the process according to the invention, an apparatus has been found to be suitable wherein there are provided two magnets which are spaced from each other and which are arranged with preferably unlike poles in mutually oppositely disposed relationship to each other, and whose magnetic, longitudinal axes are oriented in the same direction. The substrate is arranged between the magnets, preferably midway between the magnets, and electromagnetic energy and/or a so-called active charge or information energy is imparted to the substrate transversely with respect thereto, preferably perpendicularly to the direction of the magnets' longitudinal axes and to the incidence of radiation.

Permanent magnets or electromagnets may be used in that connection. In addition, the apparatus may also be equipped to provide a magnetic field oscillation. If the magnetic field poles are arranged in respectively different orientations relative to each other, it is possible to achieve various substrate properties. The substrates can then be applied for various end uses. The potential uses of the substrates treated according to the invention are manifold.

In experimental operations with liquids, a certain modification in the property of substrates was surprisingly detected, namely that the absorption properties of the liquids are modified. It is believed that information energy, and in particular, electromagnetic information, is impressed on the liquid substrate placed in a magnetic field of appropriate strength and oriented in a given fashion. The modifications in the absorption properties are retained even after elimination of the magnetic field and the information energy source. There is thus shown to be a storage capacity in the modified substrates for the transferred active force or information energy.

It has surprisingly been found that a substrate according to the present invention, which has an energy active charge, and in particular an active charge which is transferred to its material structure, can be detected spectrophotometrically in a modified absorption property, in relation to an active, charge-free, identical substrate. The modified substrate having the transferred active charge can influence other substances which are brought into relationship therewith.

In that connection a detectable interaction or communication occurs between the modified substrate according to the invention and the other substances, and that effect may be used, for example, in the biological field (agriculture or in animal and plant procedures), but also generally as an energy interaction between various materials wherein the materials may occur in different aggregate forms or atomic and molecular structural forms, including in relation to crystalline or reciprocal transfer or communication of energy forces. There is a detectable modification of the substance properties and the active forces of the substances or materials involved.

The modifications in active force or corresponding modifications of properties in respect of the substrate according to the invention may be permanent and may also be inherent in the substrate in oscillating form.

BRIEF DESCRIPTION OF THE DRAWINGS

The present invention can be better understood by reference to the drawings in which:

FIG. 8b is a perspective view of a dual toroidal solenoid apparatus as shown on FIG. 8a.

DETAILED DESCRIPTION OF THE PREFERRED EMBODIMENTS

Various embodiments of the apparatuses of the present invention are illustrated in FIGS. 1, 4, 5 and 6.

Figure 1:
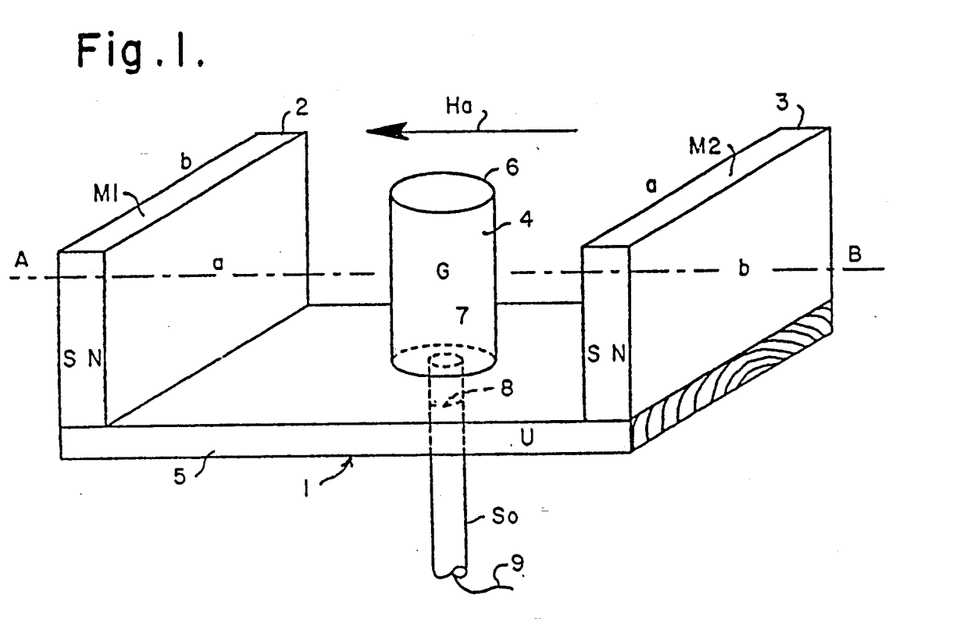
FIG. 1 is a diagrammatic perspective view of an apparatus according to the invention.

The basic arrangement for the treatment of liquids as substrates with a variation in the absorption properties thereof in a magnetic field is shown in FIG. 1. The magnetic field strength Ha is produced by permanent magnets 2 and 3 which are disposed in mutually opposite relationships in an opposite-pole configuration, on non-magnetic support 5. Disposed approximately in the middle of the arrangement is a glass vessel 6 with a substrate 4 to be treated, in the form of a liquid. The respectively selected information energy is supplied to the liquid in the glass vessel 6, perpendicularly to the orientation of the magnetic field Ha, by way of a probe So or 8, 7. In that connection, the glass vessel 6 may also be closed.

The magnetic longitudinal axes A and B of the two permanent magnets 2 and 3 are oriented in the same direction relative to each other. The probe So may be brought in either beside the substrate 4 or the vessel thereof (FIG. 1; 8) or through the non-magnetic support 5 to the substrate, from below (FIG. 1; 7). The information energy is supplied to the probe So by way of the connection 9.

However, the supply of information energy does not necessarily need to be perpendicular to the magnetic field Ha and instead of by way of a probe, may also take place by way of mirrors or reflectors, in particular, parabolic reflectors, or also parabolic antennae, and can thus be supplied to the substrate in a directed manner from different sides within the magnetic field. The probe So may also be arranged in a semiannular configuration or a horseshoe-like configuration around the outside surface of the vessel 6, for example, in a similar manner to a tongs assembly. With certain forms of energy, it is even sufficient to use a cord-like antenna for supplying the information energy, which either extends into the substrate or can be arranged beside the substrate.

The information energy used may be sound, electromagnetic laser beams or light energy. Additional oscillations may also be pulsed thereon. For that purpose non-electromagnetic energy may be used, such as particle radiation or some other type of radiation.

It was found that the action of the magnetic field strength on the modification in the absorption properties of the substrate is changed if, in the arrangement shown in FIG. 1, the magnets 2 and 3 are interchanged with each other in parallel relationship, without altering the position of their poles. In that case, instead of the poles a, a (as shown in FIG. 1), the poles b, b are therefore disposed in opposite relationship.

As the magnets 2 and 3 are of the same form, comprise the same material and also have the same permanence, the same magnetic field strength is admittedly produced in numerical terms and in respect of polarity, with the same spacing between the mutually oppositely disposed and parallel pole surfaces; but the effect on the absorption properties of the substrate is different.

Figure 2:
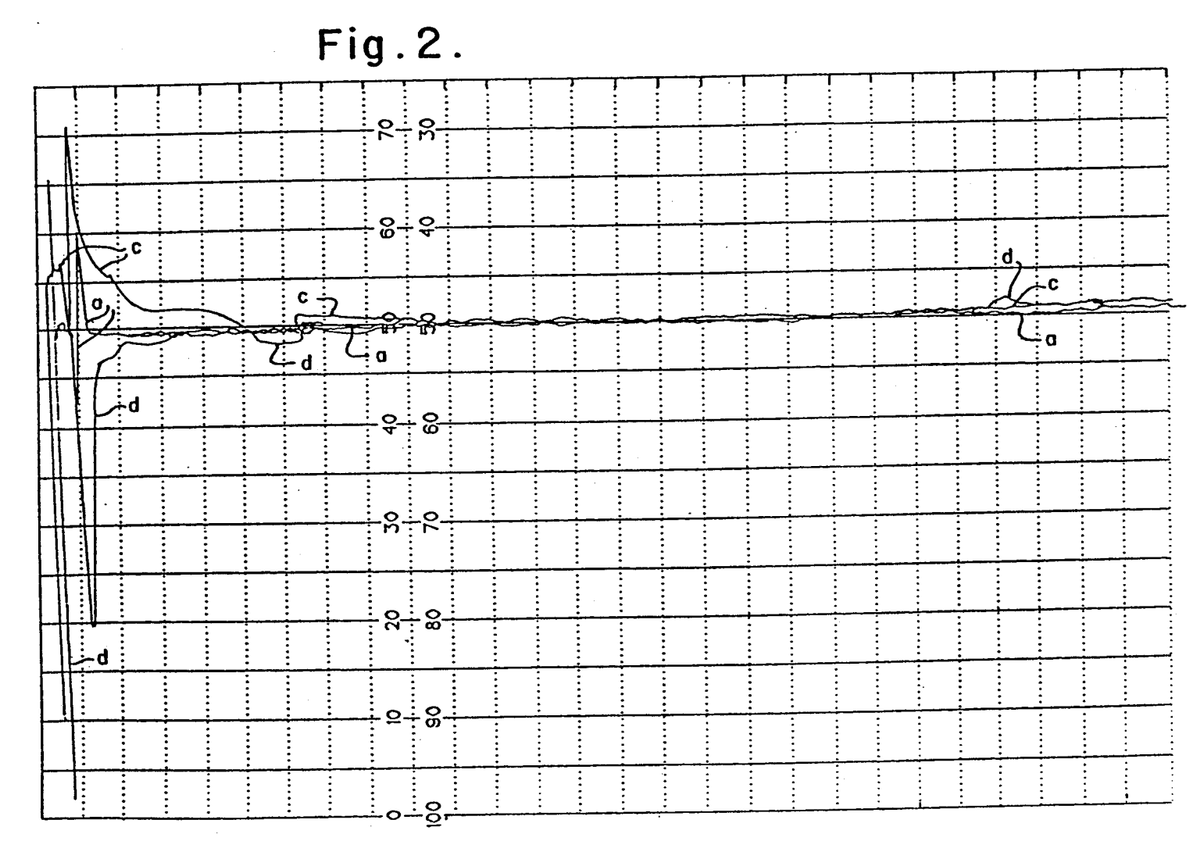
FIG. 2 is a line recorder recording of a photometric absorption measuring device without the supply of information energy by way of the probe shown in FIG. 1 to a given substrate and spectrum lines with a magnetic field of different directions for a substrate treated with information energy.

FIG. 2 shows the absorption spectra which were obtained with a 0.9% common salt solution as the substrate, wherein the curve a, as a base curve, shows the spectrum in the basic position of the magnets 2 and 3, as illustrated in FIG. 1, with the corresponding magnetic field strength Ha, for the liquid, as the substrate, which was in a "virgin" condition originally prior to being introduced into the glass vessel. In that measuring operation, no energy information was imparted to the common salt solution by way of the probe So.

The curves have the following comparative significances:

Curve a: a base line curve is produced when the same "virgin" 0.9% common salt solution is disposed in the rear and in the front cuvettes of the twin-beam spectrophotometer Lambda 3 from Perkin-Elmer. 100 mm Hellma cuvettes were used as the cuvettes in all measuring operations.

Curve c: a "virgin" 0.9% common salt solution is disposed in the rear cuvette, while the front cuvette contains the same solution after it has been treated with energy information by way of the probe So in the arrangement shown in FIG. 1, in a magnetic field of field strength Ha.

Curve d: the rear cuvette contains a "virgin" 0.9% common salt solution after it was treated in the arrangement shown in FIG. 1 in a magnetic field with the field strength Hb, that is to say, with magnets interchanged in parallel relationship.

In the measurements shown in FIG. 2, the speed of registration of the recorder was 60 nm per minute, the ordinate range was plus 0.1 to minus 0.1, the recorded wavelength range extended from 190 nm to 900 nm, and the scale division of the abscissa was 20 nm/cm with the upper limit at 190 nm.

The difference in respect of the absorption curves, that is to say, both in respect of the curves c and d relative to each other and also in comparison with the base line curve a is so striking that the physical effect achieved is evident. In accordance with the known physical laws, with the same applied magnetic field strength, a difference in the two absorption curves could probably really scarcely occur. That is considered to constitute proof of a given physical active force of bipolar nature, which is capable of modifying the molecular or crystal structure of matter or substances and thereby, at least in regard to transparent solid bodies and liquids, influencing the absorption properties thereof by modifying the magnetic quadrapoles.

The physical active force can also be transferred by electrically non-conductive media. There is evidence that force and the organizational or orientational patterns contained therein is crucially involved in all biological processes. Corresponding test results point positively thereto.

Figure 3:
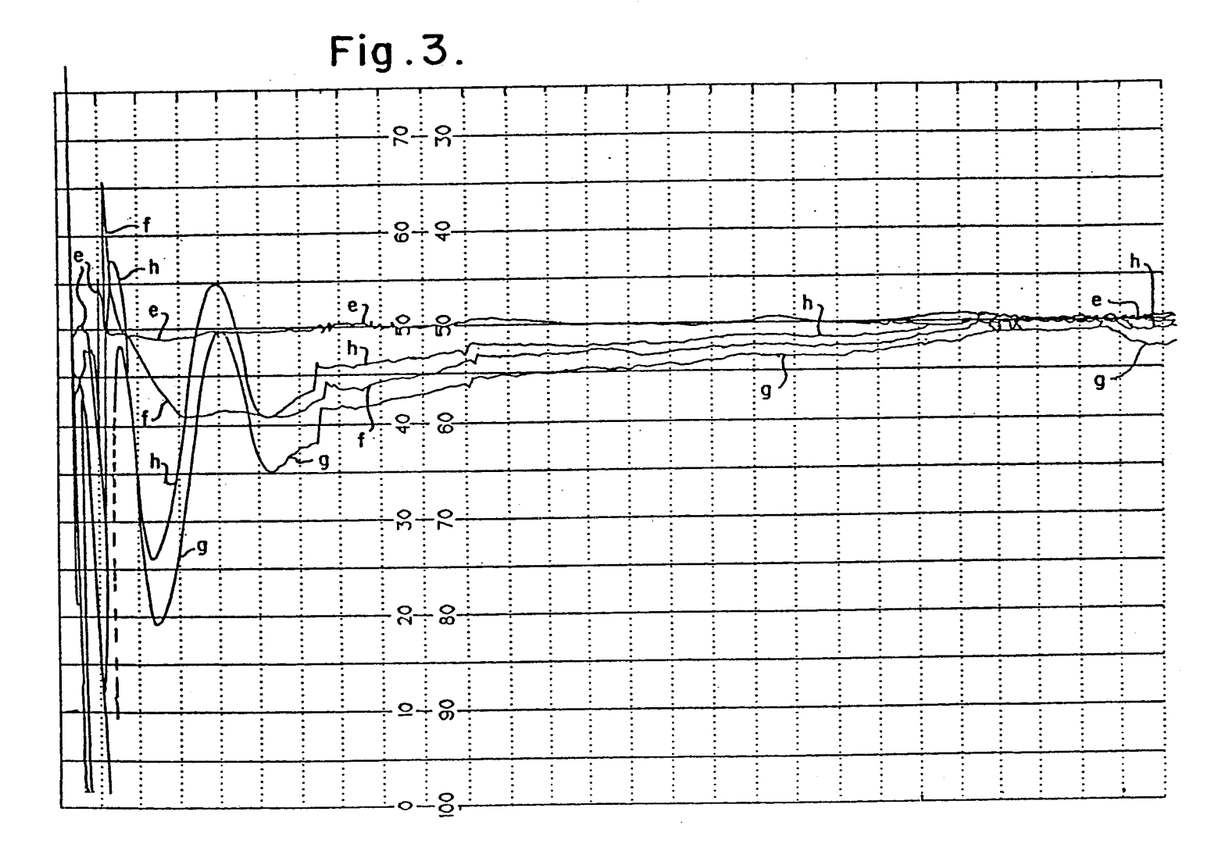
FIG. 3 is a line recorder recording of a photometric absorption measuring device after treatment of a given substrate in a magnetic field by means of a supply of information or active energy of various frequencies by means of the probe shown in FIG. 1.

FIG. 3 records the result of investigations which were carried out with a 0.9% common salt solution to which, for example, electromagnetic information was imparted in the audible sound and ultrasound ranges, in a magnetic field, when using in each case original "virgin" samples.

The curves have the following significances:

Curve e: a base line curve is produced when the same "virgin" 0.9% common salt solution is contained both in the rear and in the front cuvettes of the twin-beam spectrophotometer Lambda 3 from Perkin-Elmer.

Curve f: the rear cuvette contains a "virgin" 0.9% common salt solution while the front cuvette contains the same solution after it has received energy information in the arrangement shown in FIG. 1 in the magnetic field Ha by means of the probe So with a frequency of 427663 Hz.

Curve g: rear cuvette as in the case of curve f while the front cuvette contains the same original "virgin" solution after receiving energy information at 16180 Hz.

Curve h: rear cuvette as in the case of curves e and g, while the front contains the original "virgin" solution after receiving energy information at 1655 Hz.

In all the measuring operations represented in FIG. 3, operation was with the magnetic field Ha.

The recording speed of the recorder was 60 nm/min.; the ordinate range was plus 0.05 to minus 0.05; the recorded wavelength range extended from 190 nm to 900 nm (the upper limit is always 190 nm) and the scale division of the abscissa was 20 nm/cm.

All the tests involved using two permanent magnets from Thyssen Edelstahlwerke AG type designation 77.121-108467-oo.4 of oxide 300 K, the spacing between the mutually oppositely disposed faces of the permanent magnets being for example, 25 cm.

As a further use of the substrate according to the invention, gene modification is possible by transfer of orientation structures imparted to the substrates.

In the treatment of the substrate according to the invention, the magnetic field Ha or Hb is believed to form an intercessor-like requirement for reception of the information energy by the substrate. In a similar manner further information energy may also be imparted to a substrate which is already provided with information energy, whereby the information energy or an active force which is made up of the two forms of information in interfering or also resonant relationship is produced in the substrate. Instead of a probe So, it is also possible to use a substrate which is already provided with information.

A substrate once provided by the process of the invention with information energy or an active force is capable of further transmitting its information to other matter in its area of influence, in particular in any other magnetic field such as, for example, the earth's magnetic field, while the respective strength of the magnetic field may have an influence on the intensity of the transfer effect.

Figure 4:
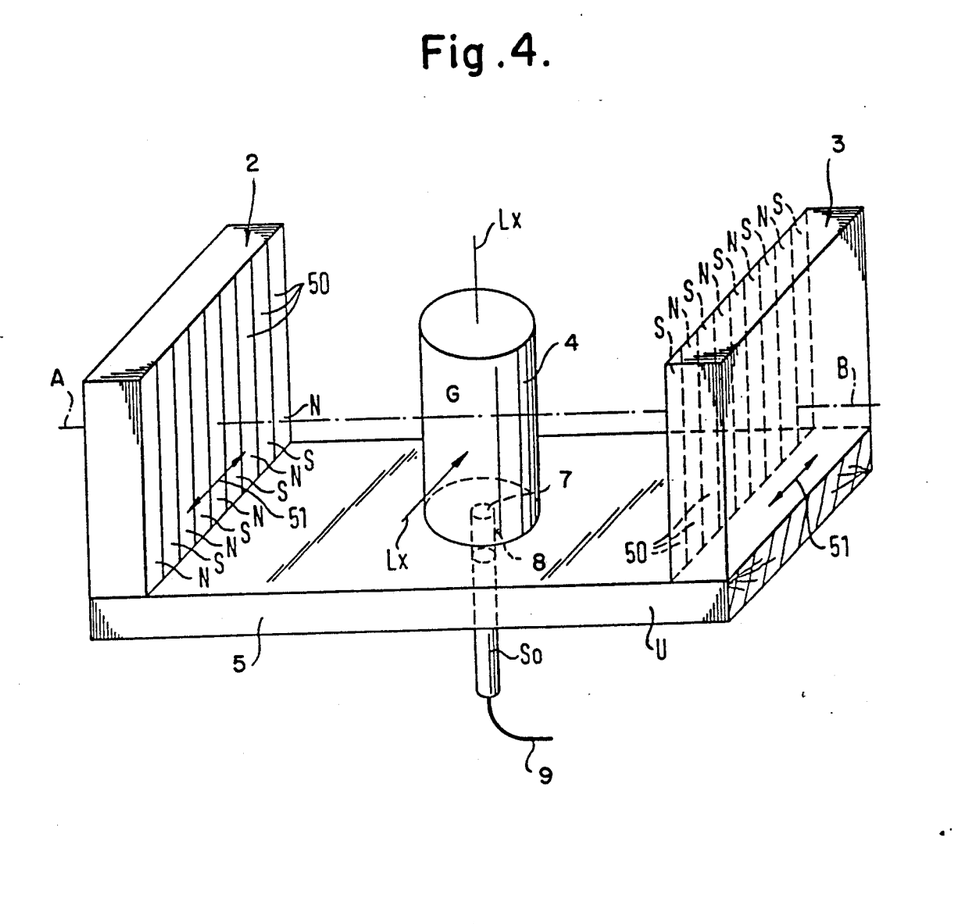
FIG. 4 is a modification of the arrangement of FIG. 1 wherein the permanent magnets are subdivided into individual striplike magnets with alternating North-South poles.

FIG. 4 shows an arrangement similar to FIG. 1 in which the permanent magnets M1 and M2 are subdivided into individual striplike magnets with an alternating North-South pole arrangement. In the embodiment shown, each individual magnet strip 50 is also opposed by the alternative pole. By the use of a parallel swinging effect (see arrows 51), such polarity arrangement can be easily changed, for example, by arranging the same poles facing each other. Such a sidewise, offset, swinging, pole-changing arrangement can be performed even with high frequencies.

The arrows Lx vert(ical) and Lx hor(izontal) demonstrate the penetration direction of a laser beam as the carrier of the information.

Figure 5:
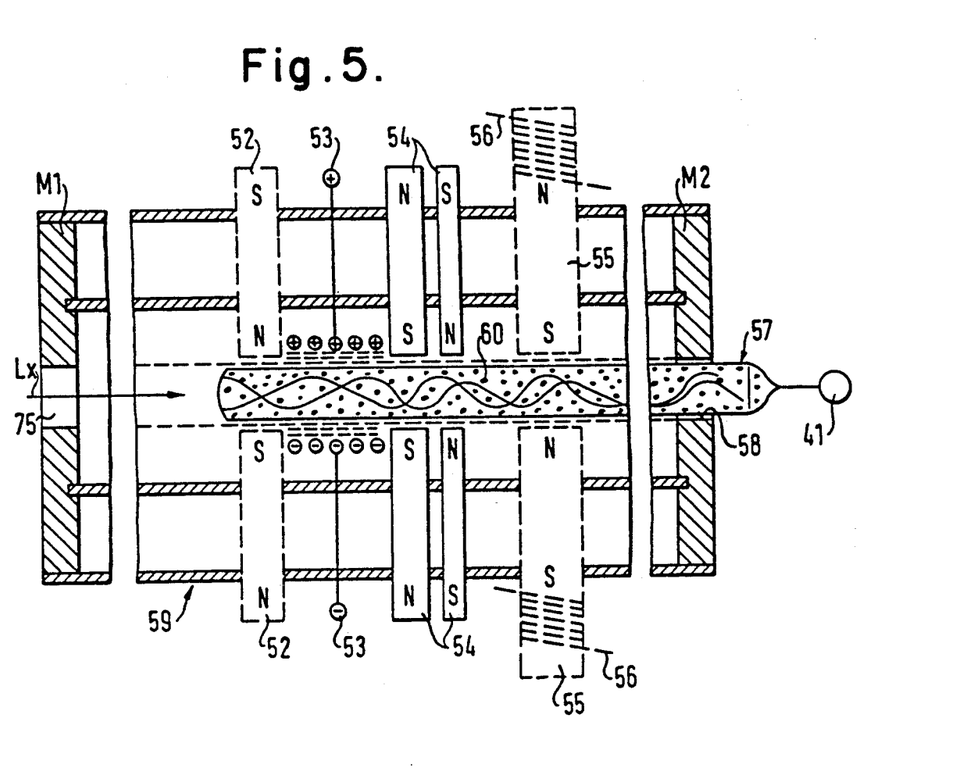
FIG. 5 is a schematic cross-sectional view of an alternative embodiment of an apparatus according to the invention.
Figure 6:
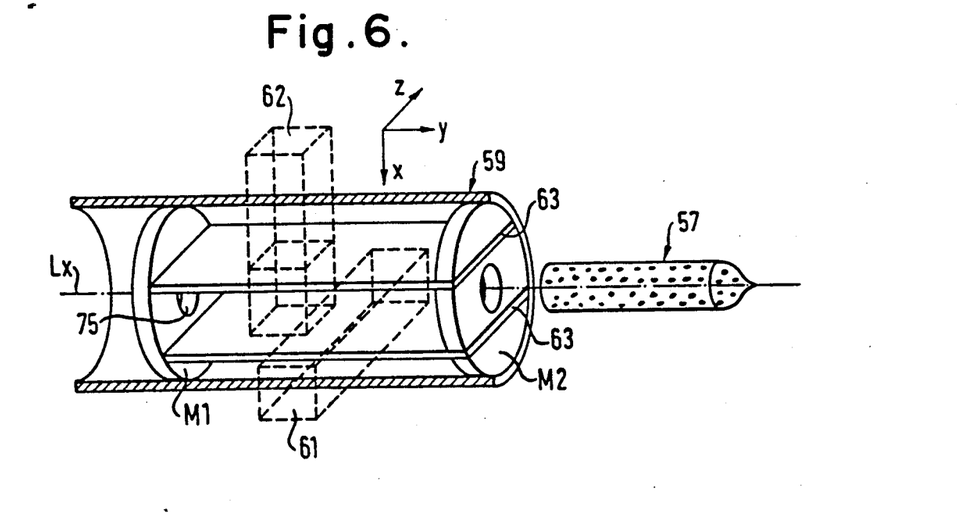
FIG. 6 is a cross-sectional perspective view of an alternative embodiment of an apparatus according to the invention.

FIGS. 5 and 6 show two different devices allowing a combination of different arrangements of the exciting or energizing energy field.

Between two permanent magnets M1 and M2 inside the part between the broken end portions, there are a pair of magnets 52 and/or a pair of electrostatic electrodes 53 and another double pair 54 of permanent magnets with different size and different South-North pole arrangements and/or an electromagnetic device 55 with magnetizing coils 56. All these fields, which can be applied in many variations within the housing 59 around the cuvette 57 linked with the substrate (normal saline), influence the wave and frequency acception (or reception) of the information introduced by the laser beam Lx.

FIG. 6 shows a simpler device having two endwise arranged magnets M1 and M2 and additional electrostatic field planes 63 and different possibilities to arrange the cuvettes 61 and 62 in the room axis x-y-z. Instead, an ampoule-like cuvette can be arranged right in the center axis into which the information loading laser beam is directed. The housing 69 according to FIGS. 5 and 6 can be slipped on a laser beam head by the opening 75.

Figure 7:
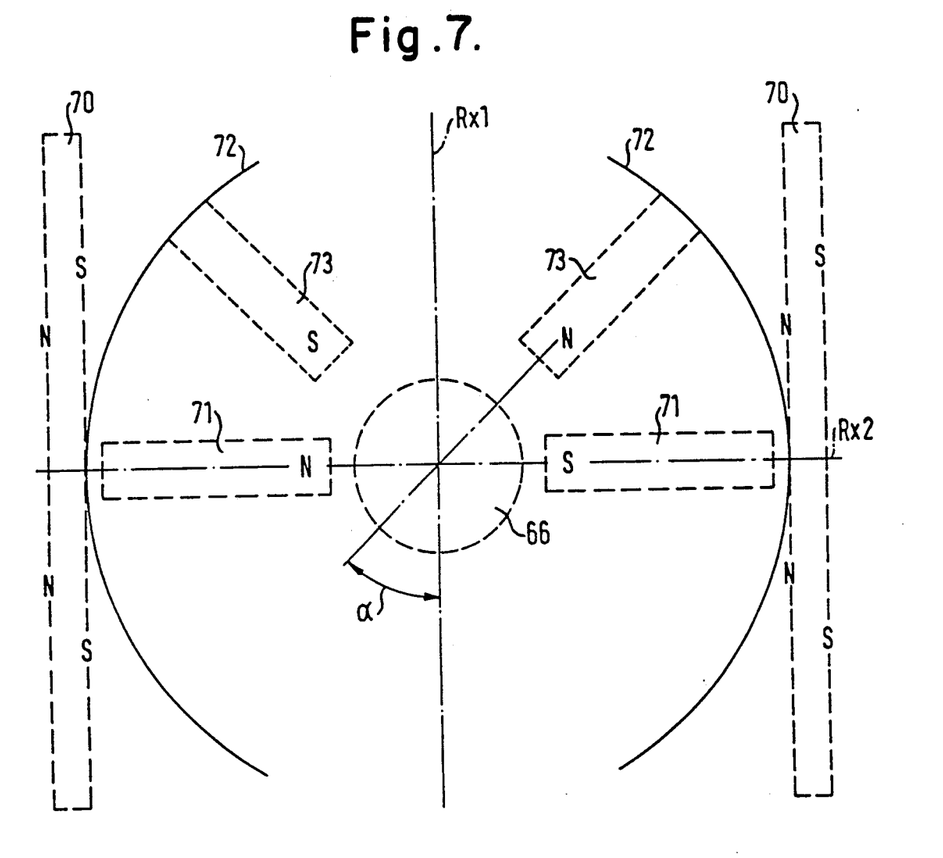
FIG. 7 is a schematic view of an embodiment of the apparatus of FIG. 5 or 6 wherein the magnetic field can be rotated.

Finally, FIG. 7 schematically demonstrates a number of variations in using rotation for the performance of dynamic or moving fields of the magnets or electrostatic electrodes shown in FIGS. 5 and 6.

As a first possibility the pair of magnets 70 can rotate around the vertical rotation axis R x 1 or they alternatively can rotate in counter direction to each other around the horizontal axis R x 2.

The magnet 71 can as another embodiment, rotate around the axis R x 1 around the probe G being arranged in the center of rotation.

Also, supports 72 can be equipped with permanent magnets 73 and can rotate around the axis R x 1 influencing the substrate or probe G in the center of rotation in a distinct, but different angle. Generally, a number of such magnets 73 can be provided all inside the one or two supports 72 being directed with their field centrally to the probe. Finally, the supports can rotate in counter directions. The distance of the field energizing means to the probe is another parameter of effect but generally within the originally disclosed distance up to, for example, 25 cm.

The embodiments of the apparatus of the present invention shown in FIGS. 4, 5 and 6 permit a greater degree of variation in the kind of electrical energy fields applied to the substrate. The substrate may be a probe of normal saline in a cuvette or probe vessel. The alternative embodiments also permit the use of modulized laser energy for applying the information energy to the substrate being prepared for incorporation of the information based on oscillation, mixtures of oscillations of different frequency, shape and amplitude and modulations thereof by means of a magnetic field.

Figure 8A:
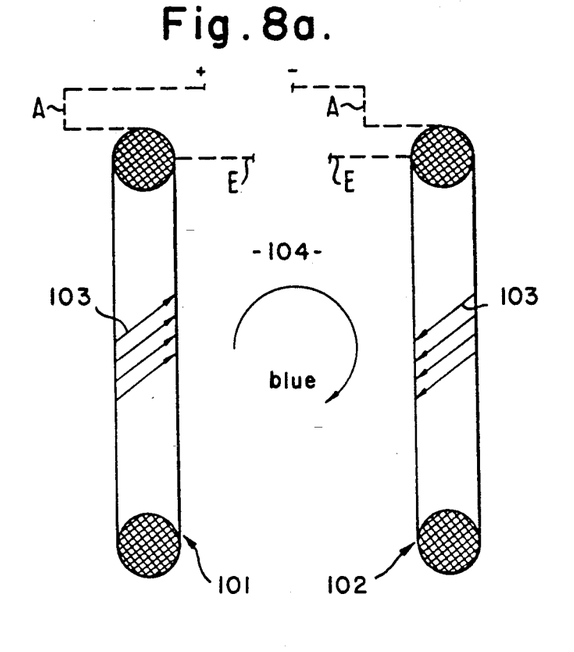
FIG. 8a is a cross-sectional view of a dual toroidal solenoid apparatus for creating a sphere of influence between the solenoids.
Figure 8B:
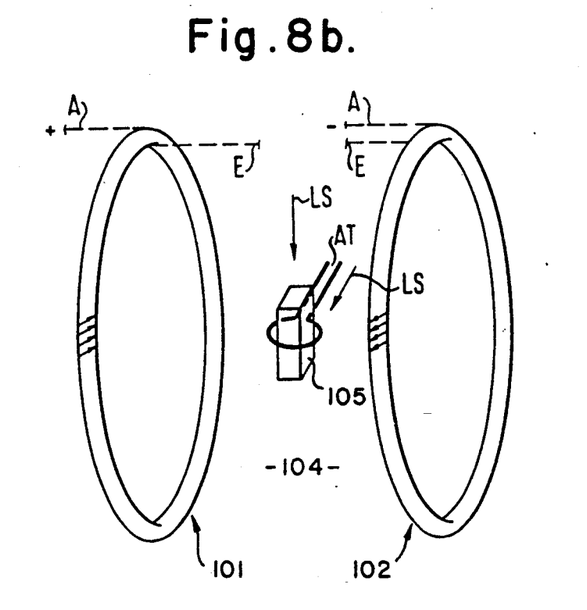

Referring to FIGS. 8a and 8b toroidal solenoid coils 101 and 102 are illustrated schematically as a longitudinal section and as a perspective view, respectively. Coils 101 and 102 are provided with oppositely oriented directions of direct current flow in their coil windings, and between them they form a sphere of influence 104 of their magnetic vector potentials. The sphere of influence 104 is substantially free from other magnetic fields. The sphere of influence is indicated as the "blue zone" in FIGS. 8a, 8b, and 8c, exerts a dextrogyrating effect on materials (e.g., a physiological saline solution or water/alcohol solution) place in the sphere of influence.

Figure 8C:
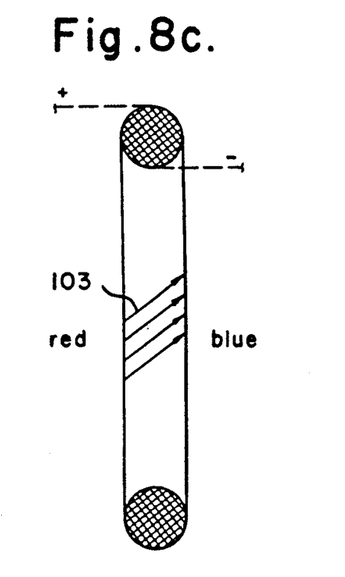
FIG. 8c is a cross-sectional view of a single toroidal solenoid.

Referring to FIG. 8c, when the current is applied in a particular direction at the right and at the left of the flat sides of a single toroidal coil a sphere of influence rotating to the right and a sphere of influence rotating to the left is created. The sphere of influence rotating to the "right" and to the "left" can be observed with a small compass needle which experiences a slight deviation to the right or the left (up to 10° to 15°) from the normal geomagnetic orientation in the absence of other interfering magnetic fields. It should be appreciated that toroidal solenoid coils 101 and 102 are operated with direct current and can be connected in series. In an experimental arrangement their axial distance from one another was 15 to 30 cm.

The "blue" (apparently turning clockwise) and "red" (apparently turning anti-clockwise) spheres of influence will reverse, if the direction of current is reversed in the coil windings 103.

Figure 9:
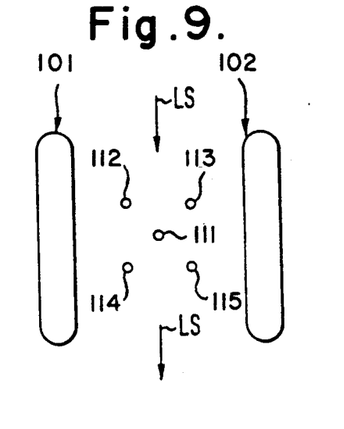
FIG. 9 is a schematic view of the effect of an apparatus as shown in FIG. 8a when a material is passed through the sphere of influence between already oriented materials.

Referring to FIG. 8b, if an isotonic saline solution is inserted in the sphere of influence 104 between the two toroidal coils in a cuvette 105 and the solution is examined with an UV/VIS-spectrometer, strongly changed absorption properties are observed. The resulting absorption properties are dependent on whether the solution was exposed to the influence of the magnetic vector potential in the "red" or "blue" sphere of influence. The intermediate line curve 9 of FIG. 109 was achieved with an untreated test material. Other experimental arrangements can be provided at points 111-115 as shown in FIG. 9.

Figure 10:
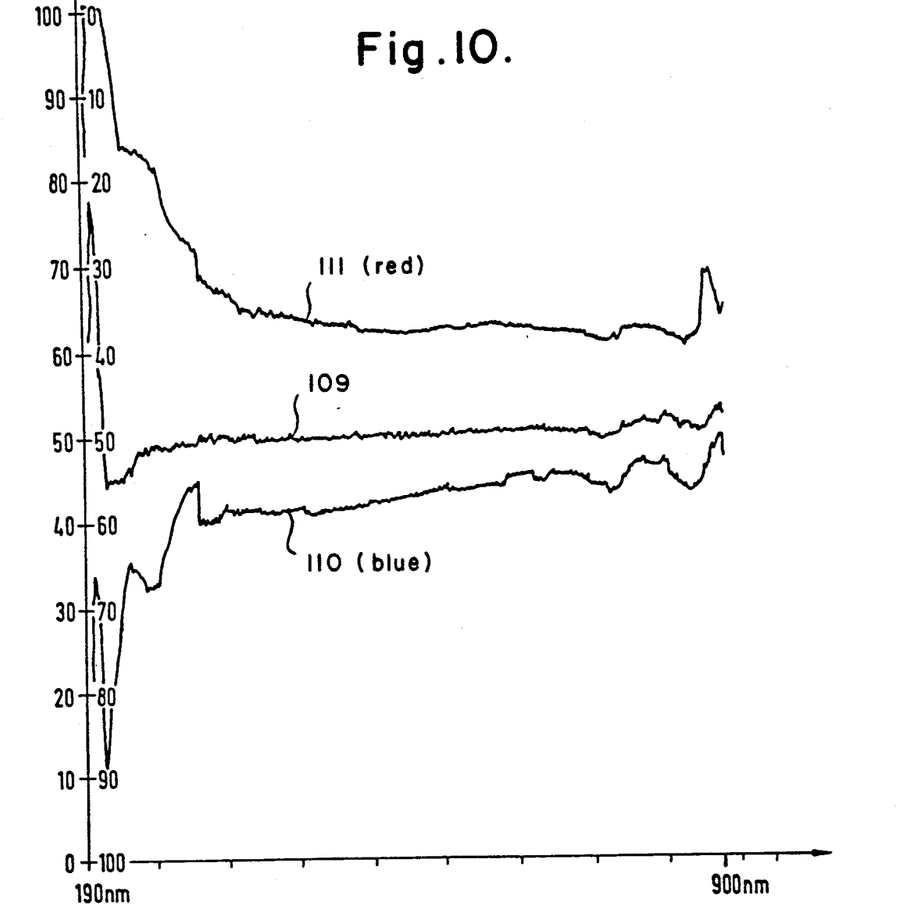
FIG. 10 is a line recorder recording of the UV/VIS spectrometer of an isotonic saline solution as treated with red and blue spheres of influence.

Toroidal coils 101 and 102 are wound in the same directions, however, they are turned towards one another by 180°. This results in a "blue" sphere of influence 104 between toroidal coils 101 and 102, and with a reversal of polarity it results in a "red" sphere of influence. The opposite effects of the red and blue spheres of influence is depicted in FIG. 10.

While the magnetic field is exclusively within toroidal coils 101 and 102, if the toroidal coils are provided with a ferromagnetic core strongly conducting the magnetic flux, the resulting magnetic vector potential extends in the environment thereof which is free from other magnetic fields.

The use of toroidal coils is only one of many solutions for creating a sphere of influence of a magnetic vector potential field.

The additional modulation of energy by laser or electromagnetic waves is shown schematically in FIG. 8b with the symbols LS (laser beam) and AT (high frequency antenna).

With respect to FIG. 9 still further embodiments of the invention can be explained. If materials already oriented in a programmed manner are arranged (e.g. between the toroidal coils 101 and 102) at points 111 and 115 or at one or more of these points; and a substance to be programmed, such as a liquid, a gas, or an electromagnetic wave (i.e., laser light) is conducted through the apparatus in the direction of the arrows LS; the materials arranged at those points act as agents or transmitters of information towards the substrate continuously passing through the sphere of influence 104. In this manner the transmission of information can be effected with or without a direct contact. For example, without a direct contact by means of a liquid, a gas, or a bulk or loose material of any kind in a pipe. A plurality of such transmitters of information arranged in a combined manner permits the realization of the transmission even of complex, synergistically advantage-optimized information patterns.

Referring again to FIG. 4, another embodiment of the invention is shown schematically. On a base plate 25 of wood, in the longitudinal direction of axis B-C at a horizontal distance of 25 cm from one another a set of magnets is arranged changing stripwise, respectively, with respect to the polarity thereof, whereby preferably the north pole (N) of a magnetic element 50 of the one set of magnets 22 is opposite of the south pole (S) of a magnetic element of the other set of magnets 23, respectively. In a preferably horizontal direction 51 the individual magnetic elements 50 alternate relative to their polarity arrangement, the strip arrangement thereof being oriented vertically with respect to the base plate resp. base plate 25.

Analoguous results are achieved if the strip-like magnetic elements 50 are arranged one above the other in the horizontal direction. For achieving other results the same poles can be arranged, too, opposite to one another, respectively, which are provided in an alternating manner as far as their strips are concerned. In specific cases the strip magnets can be vibrated in parallel with one another respectively opposite to one another at a low frequency, however, also at a high frequency (>1 KHz).

Within the space laterally limited by the sets of magnets 22 and 23, and preferably in the middle thereof, a cuvette 24 is arranged, within which a liquid to be coined resp. marked with an information, e.g. water or a 0.9% aqueous saline solution (physiological saline solution) or also a gaseous substrate is provided. In an alternative arrangement this range of field between the sets of magnets 22 and 23 can also be flown through the substrate in a continuous manner.

Instead of a liquid or a gaseous substrate in the range of field also a solid or powdery substrate can be arranged.

The coining or marking of information onto the substrate within the range of effect is made higher with an antenna 29 of a probe so passed through the base plate (at 28) with the connection 27 to the cuvette 24, i.e. in the direction of the axis Lx (vertical) extending in parallel with the extension of the magnetic elements 50, or transversely in the direction of the axis Lx (horizontal).

The information consists in vibrations or combinations of vibrations across the entire range of frequency of more than 0 Hz to a vibrating frequency in the range of soft gamma beams, using that frequency or combination of frequencies which is known to be the optimum for the desired—e.g., therapeutical or biological—purpose. The following effective frequencies are already indicated: 16,330 Hz, 16,803 Hz, 17,110 Hz, 18,080 Hz, 17,820 Hz, 17,650 Hz, 7290 HZ, 15,065 Hz, 17,290,795 Hz, 1,252,123 Hz as well as 7720 Hz, 7750 Hz, 138,737 and 73,311 Hz.

Figure 11:
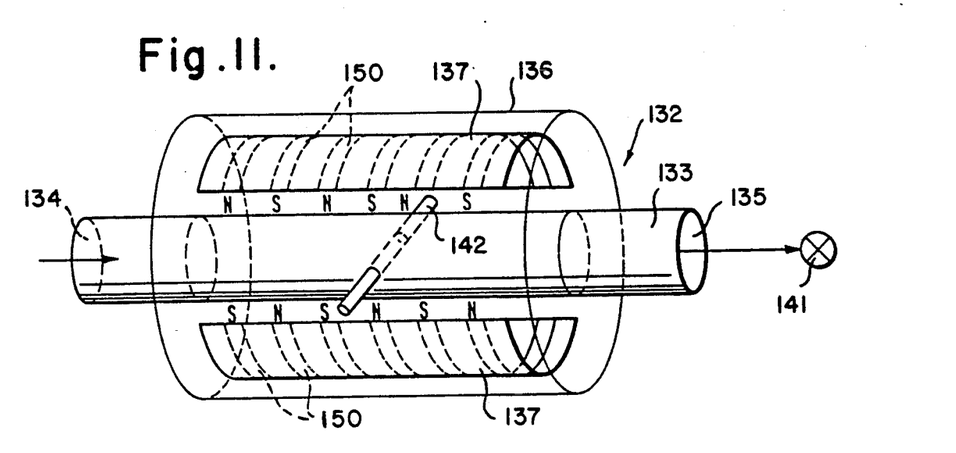
FIG. 11 is a perspective schematic view of another embodiment of the present invention.

Referring to FIG. 11, the use of magnetic vector potentials by means of permanent magnets is explained in more detail with respect to a further embodiment of the invention which can be applied in a practical and simple manner. Through the axial center of an otherwise closed pipe 132—closed at the circumference and at the front faces—made from a synthetic material, a passage 133 extends, having an inlet 134 and an outlet 135.

Over and around at least part of the circumference 136 around the passage 133, magnetically structurized magnets 137 are provided in a stripwise arrangement and are arranged radially opposite to one another. These magnets 137 may be provided as flexible magnetic foils having a relatively weak magnetic force in a range of only 0.22 Tessla (e.g. having a thickness of approximately 1.5 mm). The individual magnetic elements 50 are spaced closely together and extend the form of strips in the circumferential direction (e.g. 1.5 to 3 mm). The portions having the same polarity in such a closely spaced arrangement may also be oriented respectively aligned in the axial direction.

Figure 13:
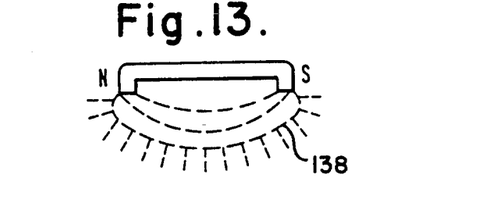
FIG. 13 depicts the magnetic vector potentials of the apparatus shown in FIGS. 11 and 12.
Figure 14:
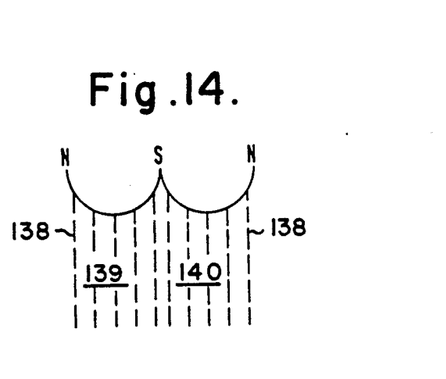
FIG. 14 depicts the magnetic vector potentials of the apparatus shown on FIGS. 11 and 12.

Between the sets of magnets 137 and transversely to the direction of passage 133 a cuvette 12 is arranged within the meaning of FIG. 11. The closer the individual strips of the magnetic elements 50 are arranged the shorter the magnetic line between the magnetic poles N/S (i.e., they only extend very closely to the inner wall of the magnets 137). The vector potentials 138 which are vertical with respect to the magnetic lines extend radially (according to FIG. 11 and schematically enlarged as shown on FIG. 13) into cross section 133, towards the opposite magnetic element 150, polarized as far as the vector is concerned. From this result axially successive zones 139 and 140 of an opposite vector direction, which penetrate the cross section of passage 133 shown schematically in FIG. 14.

Figure 15:
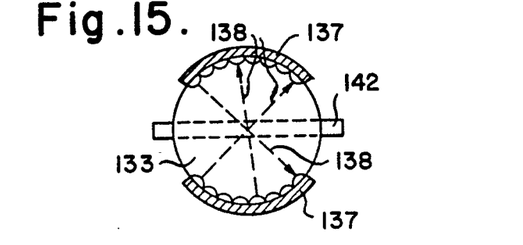
FIG. 15 depicts a schematic view of a curved embodiment of the apparatus shown in FIG. 12.

Surprisingly the vector potentials 138 of the magnetically relatively weak magnetic foil 137 intensely and lastingly coin or mark the media flowing through passage 133—with a diameter of between 10 to 50 mm with information of their "fine structure" on "minor energy of structure". In contrast FIG. 15 shows the field relations of magnetic poles arranged axially at a greater distance, between which the magnetic field lines describe a large arc and penetrate deeply into the media, resulted in vector potentials which are diluted, extend radially, and less concentrated radially.

Figure 16:
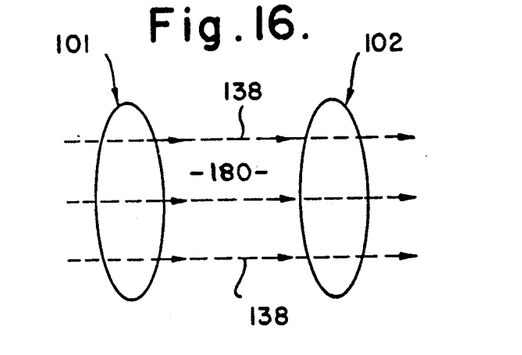
FIG. 16 depicts the magnetic field potentials for the apparatus in FIGS. 8a and 8b.

Instead of a water jet, a laser beam can be directed through passage 133 from inlet 134 towards outlet 135 to an object 141 (e.g., an acupuncture point of a subject). In this case the laser beam 145 is guided closely past the probe cuvette 142 in the center portion of the passage (see FIG. 16 left-hand side), or guided through an opening in the cuvette. The laser beam receives the frequency information from the media in the cuvette (i.e., it becomes modulated thereby and transfers this information to the object).

Referring again to FIGS. 5 and 6, an apparatus operating with electric vector potentials and magnetic vector potentials is illustrated schematically in a longitudinal section and as a perspective schematically transparent view (partly broken away) in respectively.

At both sides of the radial longitudinal axis Lx there are provided permanent magnets 52 and 54, which can be switched on from the outside and are inserted in casing 59 at both sides toward the axial passage. As an alternative, differently strong magnets, also at an arbitrary axial distance from one another as well as eleotromagnets 55 with windings 56 can be used. Combined therewith are electromagnetic fields of charge 53, e.g. capacitors can be applied.

The cuvette 57 can be filled with a liquid respectively e.g. a transparent information media 60, through which a laser beam Lx can be directed to an object 41 through the inlet 75 in the longitudinal direction of the center axis, said object then being under the effect of the laser beam achieved in this way and modulated in a frequency-coined manner. The cuvette or probe may also be filed with a solid information media 60 and may project only closely to the laser beam. As a laser helium-neon-laser or e.g. a diode laser or other types of laser can be used having 0.5 W and a frequency of 632.8 nm. Such an influence and effect by the laser is required only for a few seconds.

In the further modified embodiment according to FIG. 6 additional positions of introduction 61 and 62 of additional cuvettes as well as additional capacitor plates 63 are provided, which are provided between the magnets M1 and M2—arranged also at the front faces—within the casing 59.

With respect to the apparatus schematically shown in FIG. 7 as a plain view, around an intermediated area receiving the cuvette 66 between two magnets 70 at the end sides magnets 71 adjustable as to their angular position with respect to the two horizontal axes Rx1 and Rx2, are provided, respectively magnets 73 adjusted at a angle of a circular path 72.

In the apparatus according to FIG. 7 frequency information depending on an angle of rotation can be coined respectively marked on a substrate at the position of the cuvette 66.

Moreover a plurality of magnets 71/73 can be used, and these magnets can be applied for the coining respectively marking of information by means of a pronounced and definite rotation.

The use of the above described marking of information of magnetic fields by means of electric fields, and in particular under the influence of the electromagnetic and/or electro-static vector potentials resulting therefrom, can be applied to practically all energetic or bio-energetic fields. Since the eleotromagnetic or electric energy requirements for this method due very low, are useful engage in extensive biological fields.

Figure 12:
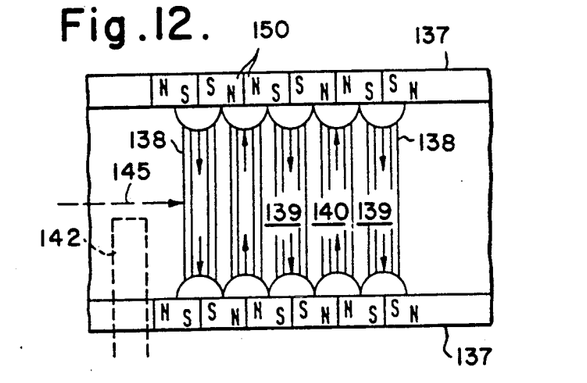
FIG. 12 is a cross-sectional view of the embodiment of the present invention depicted in FIG. 11.

For instance, an apparatus according to FIGS. 11 and 12 can be used for the treatment of water, in particular drinking water (also for the known formation of crystals of calcite instead of arragonite), for the treatment of sewage efluents, for industrial manufacturing processes and also for those in the field of medicine as well as for the treatment of environment (activation of woods and dead waters) and for the room climate (hospitals, etc.). For example space 180 according to FIG. 16 can be subjected completely to the influence of electromagnetic vector fields, between two coils according to FIG. 8a provided in two side walls opposite to one another or in the floor and the ceiling of a room.

However, it is to be paid attention to the difference effects in the blue or red zones as mentioned above. An influence and effect in the red portion of the field (corresponding to the optical rotation to the right) means a more opposite toxico-active respectively stimulating influence on biological systems. The use of both red and blue influences in combination by means of methods of the kind of "alternating hot and cold baths" may also be used.

The use of vector potentials is advantageous, in the inorganic field. For example, the process and apparatus of the present invention is also useful for the generation of new alloys and structures of materials and for the preparation of supra-conductive substances.

EXAMPLE NO. 1

A female patient who has suffered since 1975 from chronic colitis was treated as follows:

Ampoules (2 ml) containing 0.9% saline solution were placed between two magnets (2, 3) according to the arrangement shown in FIG. 1 in which arrangement, the north pole of magnet 2 faced the south pole of the magnet 3. The substrate 4 and it's ampoule vessel were placed between the magnets 2, 3. The distance between the magnets was 25 cm.

The substrate in the ampoule was energized within this permanent magnetic field through a ferrit-coil as antenna (7) with the following frequencies:

16,330 Hz, 16,803 Hz, 17,110 Hz, 18,080 Hz, 17,820 Hz, 17,650 Hz, 7290 Hz, 15,065 HZ, 17,290-95 and 12,521-23 Hz each for 1 second in the maximum.

The energized 0.9% saline solution was used to treat the patient by intramuscular injections of one ampoule every third day for a period of forty-five days.

After that treatment, the "intestinal flora" was normalized.

For additional activation of the body-immune system, in the same magnetic field, the ampoules containing 0.9% saline solution were subsequently contacted each for 2 to 4 seconds with Rosemary, quarz-crystal and vitamin-C.

The patient took one ampoule every third day in one glass of water. After this additional treatment through 20 ampoules the patient's symptoms have not recurred and her diet is not restricted in any way.

A modified process for implying the combination of frequencies with the same effect could be used by the treatment of a 0.9% saline solution within a stripwise changing magnetic field according to the arrangement shown in FIG. 4 whereby a south-pole of the one magnet is facing a north-pole of the opposite permanent magnet. (see, for example 1a).

A further modification which proved to be successful, employs the magnets 52 in the arrangement shown in FIG. 5. The same frequencies were applied to the 0.9% saline solution 58 in ampoule 57, through the axis Lx as a modulation frequency of a 632.8 nm laser beam.

EXAMPLE NO. 2

A group of patients were treated by intra muscular injection of one ampoule of a 0.9% saline solution substrate, each ampoule of which had been energized for 1 second in maximum by the following frequencies:

7720 Hz, 7775 Hz, 138737 Hz and 73311 Hz.

The frequencies were energized via 632.8 nm laser modulation in the apparatus according to the arrangement shown in FIG. 6 using permanent magnet-pairs 52. Additionally, the ampoules were contacted with thyme and white rock-crystal each for 2 to 4 seconds. One ampoule of the substrate was applied every 5 hours on the first day. On the 2nd and 3rd days, only one ampoule a day was given. Some patients felt better and their symptoms improves after 24 hours. Others felt better and their symptoms improved after 2 days.

The apparatus shown in FIG. 6 can also be used for modulating a 632.8 nm laser beam by already energized substrates in the cuvettes 57, 61/62 whereby the modulated laser beam is directed along the axis Lx on specific accupuncture or diacra points of a human body absorbing the energized frequency combination transferred from the substrate. The cuvettes 61, 62 and 57 are alternatively, the pair 61/62 however as well in combination.

The substrate produced by the process of the present invention can be used for a variety of purposes. Applicant has described the best mode for carrying out his invention. Other uses include as fertilizers and irrigation enhancements in agriculture, in the treatment and modification of human and animal semen, and as interference energy for the purpose of inclencing and neutralizing biological systems and microorganisms within such biological systems. Tests are currently being conducted to evaluate the use of the substrate produced by the process of the present invention in the treatment of acquired immune deficiency syndrome.

What is claimed is:

1. A method for applying information energy to a substrate comprising exposing the substrate to a magnetic vector potential field and directly applying said information energy to the substrate while the substrate is exposed to the magnetic vector potential field.

2. The method recited in claim 1 wherein said magnetic vector potential field occurs in a space free form magnetic fields.

3. An apparatus for applying information energy to a substrate comprising:
   a) two toroidal solenoids, said toroidal solenoids centrally aligned on a common axis and parallel to one another wherein a magnetic vector potential field is formed in the space between the solenoids by applying direct electric current in opposite directions to each toroidal solenoid; and
   b) a means for applying information energy to the substrate when the substrate is located in the magnetic vector potential field created between the toroidal solenoids.

4. An apparatus for applying information energy to a substrate, the apparatus comprising:
   a) two opposite sets of magnets, each said set of magnets comprising a plurality of magnets arranged side by side, with alternating N and S poles, wherein the substrate is exposed to a magnetic vector potential field when the substrate is placed between the opposing sets of magnets; and
   b) a means for applying information energy to the substrate when the substrate is located in the magnetic vector potential field.

5. The apparatus of claim 4 wherein each opposing set of magnets comprises magnetic foil strips having an alternating magnetic pole structure, in which the magnetic foil strips are about 0.5 to 7.0 mm wide.

6. An apparatus according to claim 4 comprising a probe which extends into the space between said opposing sets of magnets, said probe applying additional information energy to the substrate.

7. The apparatus recited in claim 4 wherein each magnet within one said set of magnets has a polarity opposite that of the opposing magnet within said opposing set of magnets.

8. The apparatus recited in claim 4 wherein the means for applying the information energy tot he substrate is a modulated laser beam.

9. The apparatus recited in claim 4 wherein the means for applying the information energy to the substrate is modulated electromagnetic radiation.

10. A method for applying information energy to a substrate, said method comprising the steps of:
    a) creating a magnetic vector potential field;
    b) placing the substrate in the magnetic vector potential field; and
    c) applying said information energy to the substrate while the substrate is located in the magnetic vector field.

11. The method recited in claim 10 wherein said information energy is applied to the substrate transversely to the magnetic vector potential field.

12. The method recited in claim 10 wherein said information energy is applied to the substrate perpendicularly to the magnetic vector potential field.

13. The method recited in claim 10 wherein the magnetic vector potential field is substantially free from other magnetic fields.

14. Apparatus for applying information energy to a substrate, said apparatus comprising:
    a) a means for creating a magnetic vector potential field which is substantially free from other magnetic fields; and
    b) a means for applying said information energy to the substrate transversely to the magnetic vector potential field when the substrate is located in the magnetic vector potential field.

* * * * *

UNITED STATES PATENT AND TRADEMARK OFFICE
CERTIFICATE OF CORRECTION

PATENT NO. : 5,138,172
DATED : August 11, 1992
INVENTOR(S) : K. E. Werner Kropp

It is certified that error appears in the above-identified patent and that said Letters Patent is hereby corrected as shown below:

Col. 12, line 41, delete "Of" and substitute therefore --of--.

Col. 13, line 33, delete "eleotro: and substitute therefore --electro--.

Col. 13, line 44, delete "filed" and substitute therefore --filled--.

Col. 14, line 46, delete "it's" and substitute therefore --its--.

Col. 14, line 63, delete "quarz" and substitute therefore --quartz--.

Col. 15, line 27, delete "improves" and substitute therefore --improved--.

Col. 15, line 45, delete "incluencing" and substitute therefore --influencing--.

Col. 15, line 58, delete "form" and substitute therefore --from--.

Col. 16, line 10, delete "opposite" and substitute therefore --opposing--.

UNITED STATES PATENT AND TRADEMARK OFFICE
CERTIFICATE OF CORRECTION

PATENT NO. : 5,138,172
DATED : August 11, 1992
INVENTOR(S) : K. E. Werner Kropp

It is certified that error appears in the above-indentified patent and that said Letters Patent is hereby corrected as shown below:

Col. 16, line 32, delete "tot he" and substitute therefore --to the--.

Signed and Sealed this

Ninth Day of November, 1993

Attest:

BRUCE LEHMAN

*Attesting Officer*    *Commissioner of Patents and Trademarks*